April 3, 1962 W. V. BUSH ET AL 3,028,441
ALKALI METAL-CATALYZED OLEFINIC CONDENSATION
Filed March 21, 1960
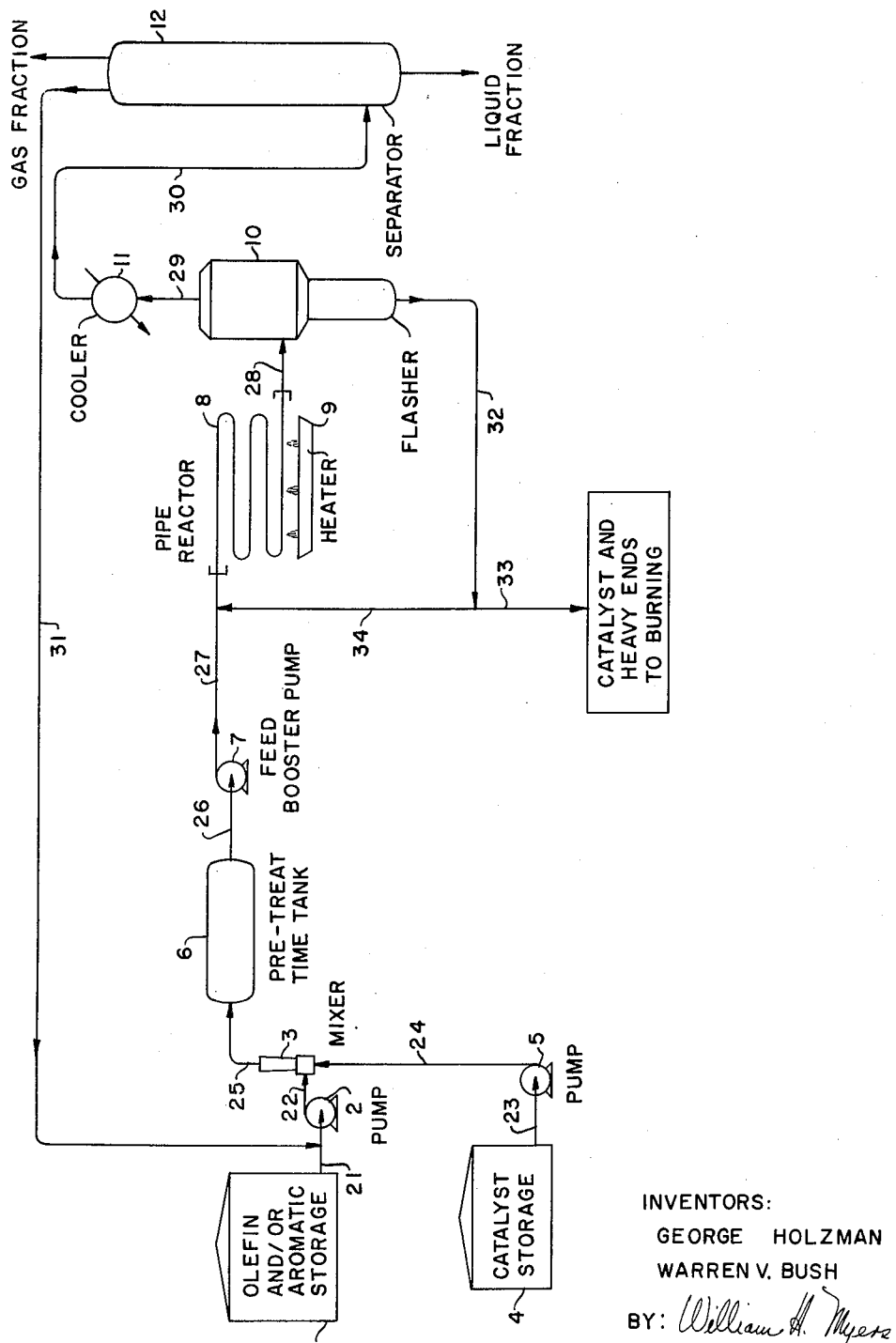
INVENTORS:
GEORGE HOLZMAN
WARREN V. BUSH
BY: *William H. Myers*
THEIR AGENT 3,028,441
ALKALI METAL-CATALYZED OLEFINIC
CONDENSATION
Warren V. Bush and George Holzman, Walnut Creek, Calif., assignors to Shell Oil Company, New York, N.Y., a corporation of Delaware
Filed Mar. 21, 1960, Ser. No. 16,465
7 Claims. (Cl. 260—683.15)

This invention relates to an improvement in chemical reactions in which metalated compounds act as reaction intermediates. More specifically, it relates to an improvement in the operating conditions of such reactions.

It is known that it is a peculiar characteristic of the alkali metals that they can form addition compounds with organic compounds containing carbon-carbon, carbon-nitrogen, or carbon-oxygen double bonds. A number of such metalated compounds have been isolated. Organic alkali metal addition compounds are particularly useful as reaction intermediates. A number of chemical reactions are known in which a compound capable of forming a metalated product by reaction with an alkali metal is condensed with another compound in a reaction in which an alkali metal acts as catalyst for the condensation. It is generally believed that the mechanism of these reactions involves the formation of the metalated intermediate of the first-mentioned compound, followed by reaction thereof with the second-mentioned compound. The metalated compounds need not be preformed or isolated in these reactions.

A reaction which is typical of the alkali metal-catalyzed reactions referred to is the alkylation of alkyl side chains of aromatic hydrocarbons by means of nonconjugated olefins. This reaction was first described in U.S. Patent 2,448,641 to Whitman. Whitman's reaction required temperatures of 150° to 450° C., pressures of 50 to 3,000 atmospheres and reaction times of 10 to 17 hours. It was thereafter found by Little, U.S. 2,548,803, that the same reaction could be carried out at pressures of 100 to 3,000 atmospheres but at lower temperatures of 0° to 130° C. when using as catalyst preformed organo-alkali metal compound such as an alkali metal alkyl or an alkali metal aryl. These reactions required 17 hours' contact time. An improvement over these reactions is disclosed by Closson et al. in U.S. 2,728,802. The catalysts were organo-alkali metal compounds of the same type. It was found that the reaction could be carried out a temperatures of 0° to 350° C. and pressures below 90 atmospheres. The reaction times in the illustrative examples were from 1.75 to 4.5 hours. The alkali metal-catalyzed alkylation of side chains of aromatic compounds was improved by Pines et al. by utilizing a variety of reaction promoters, disclosed in U.S. Patents 2,670,390, 2,688,044, 2,721,885, 2,721,886 and 2,748,178. The promoted reactions of Pines et al. are carried out at temperatures between 100° and 350° C., pressures between 5 and 50 atmospheres, and at disclosed reaction times of from 2.8 to 7 hours, most examples utilizing 4 to 5 hours.

Other typical alkali metal-catalyzed reactions are known. The alkylation of side chains of heterocyclic compounds having a nitrogen atom in a six-membered ring is shown in U.S. 2,750,384 to Closson et al. The intercondensation of olefins is shown in U.S. 2,466,694 to Freed. The alkylation of isoparaffins is disclosed in U.S. 2,834,818 to Schmerling et al.

All of these reactions are characterized in that two molecules interact, in the presence of the catalyst, to form a new compound. One of the reactant molecules must contain a double bond. The other molecule must have a relatively active hydrogen atom. It is preferable that the activity of this hydrogen be at least about equivalent to that of hydrogen attached to a carbon which is alpha to a ring carbon atom in an aromatic ring. However, under some conditions hydrogens as weak as the tertiary hydrogens of isoparaffins may react. The activity of the hydrogen atoms may be expressed on the well-known pK scale. The pK of the methyl group hydrogens of toluene is about 37, that of the allylic hydrogens of propylene is estimated to be about 36.5. The hydrogens in ammonia and the bridge hydrogens in diphenylmethane are 35. Compounds having hydrogens whose pK is 37 or lower react most readily in these processes. Those whose pK is between 37 and 40 or higher may also react at suitably severe conditions.

The molecule having an active hydrogen atom is believed to interact with the alkali metal present to form a metalated intermediate which reacts with the molecule containing a double bond. This metalated intermediate may be relatively stable or very unstable. It is generally not isolated in the condensation reactions of this invention.

At suitably selected conditions, hydrogen atoms of an olefin are sufficiently active that the two interacting molecules can actually be molecules of a single olefinic compound.

It has been noted that a so-called, "induction period," is experienced after the alkali metal and reactible materials (e.g., olefins) are brought to what is known to be a reaction or condensation temperature and pressure. The reason for this has not been ascertained. However, it causes a relatively inefficient operation of the equipment since it is necessary to maintain the reaction mixture at this elevated temperature and pressure for extensive periods in the order of 1–8 hours before any appreciable amount of reaction may occur in many instances.

It is an object of this invention to provide an improved process in which metalated compounds act as reaction intermediates. It is a more particular object of the invention to provide an improved process in the alkali metal-catalyzed condensation of compounds containing an active hydrogen atom with organic compounds containing an unsaturated linkage. It is a particular object of the invention to provide a process wherein the induction period referred to above is either entirely eliminated or substantially minimized. Detailed descriptions will become apparent during the following discussion of the invention. It is a specific object to improve the process for the dimerization or co-dimerization of olefinic hydrocarbons. The drawing illustrates a preferred apparatus to be used in accordance with the process of the invention.

Now in accordance with the present invention it has been found that the induction period and extent of condensation experienced at condensation pressures and temperatures by the use of alkali metal catalysts in contact with a compound having an active hydrogen atom can be substantially improved by contacting the condensable materials with the alkali metal under non-condensation conditions, particularly at relatively low temperatures as more particularly defined hereinafter. No clear explanation of the mechanism involved during this so-called "pretreatment" can be given at this time. However, it does not appear that any appreciable amount of condensation occurs at the relatively low temperatures utilized since the pressure change with time within the pretreatment vessel does not indicate any such condensation to be taking place. The period of low temperature contacting may serve to form a high concentration of carbanions. A second hypothesis is that the period, preferably involving agitation at low tempearture heating, results in the formation and fine dispersion of liquid alkali metals which could permit an unusually rapid or complete reaction as soon as a certain critical reaction (condensation) temperature was later reached.

The essential steps of the process of the invention are as follows:

(1) At least part of the condensable organic compounds are contacted with an alkali metal catalyst.

(2) The catalyst and organic compounds are "pretreated" by holding them at a temperature between about 20° C. and about 125° C. for a time between about ¼ and 4 hours.

(3) The condensable compounds and alkali metal catalysts are raised to a temperature and pressure at which condensation commences.

After a predetermined extent of condensation has occurred, the reaction mixture is separated to recover desired condensation products, recycle unreacted starting materials and rejuvenate or recycle the alkali metal catalysts.

The alkali metals which may be employed in the process of this invention may be a single metal or, more preferably mixtures thereof. Still more preferably, ternary mixtures are utilized wherein lithium or cesium is present as a minor constituent of the mixture. Since sodium is the cheapest of all of the alkali metals, the higher proportion of this alkali metal which may be employed to obtain desired results, the more economically efficient the process will be.

The arrangement of the alkali metals in group I of the periodic table is as follows:

| Element | Atomic Number | Period | Arrangements of Electrons in Shells | | | | | |
|---------|---------------|--------|---|---|---|---|---|---|
| | | | K | L | M | N | O | P |
| Lithium | 3 | 1 | 2 | 1 | | | | |
| Sodium | 11 | 2 | 2 | 8 | 1 | | | |
| Potassium | 19 | 3 | 2 | 8 | 8 | 1 | | |
| Rubidium | 37 | 4 | 2 | 8 | 18 | 8 | 1 | |
| Cesium | 55 | 5 | 2 | 8 | 18 | 18 | 8 | 1 |

The specific alkali metal or mixtures thereof to be employed will depend in a large part upon the identity of the starting materials and experience gained in the extent and course of reaction found to take place with the specific reactants or specific catalysts or their mixtures. Many mixtures of alkali metal catalysts will provide desired reactions which may not occur, or only occur to a slight extent, when single alkali metal catalysts are utilized. For example, the dimerization of propylene with a single alkali metal catalyst may result in a product whose $C_6$ fraction consists mainly of internal olefins and very little 4-methyl-1-pentene. On the other hand, the use of mixtures of alkali metals from nonadjacent periods of the periodic table usually results in a product whose $C_6$ fraction consists mainly of 4-methyl-1-pentene, which is desired particularly for use in the formation of Ziegler polymers and the like. The hexenes produced by the use of single alkali metal catalysts are not attractive for the same purpose.

No complete explanation can be offered for the outstanding activity of the combinations of alkali metals from nonsuccessive periods. It is possible, however that the presence of uncompleted electron orbitals which is found in potassium, rubidium, and cesium and/or the lowered attraction for the valence electron in the latter elements causes each of them to coact with another alkali metal to produce an extremely active catalyst, and that such reactivity is enhanced by the substantial difference in atomic size between elements in nonsuccessive periods.

Some alkali metal combinations are more active than others. Particularly active and particularly preferred combinations of alkali metals, in decreasing order of preference, are potassium and cesium, lithium and potassium and lithium and cesium. The combination of sodium and cesium, though more active than any single alkali metal, is somewhat less active than the other named combinations. Rubidium is a relatively rare metal and its combinations are, therefore, less preferred for economic reasons.

It is preferred that these alkali metal catalysts be unsupported since this has been found to promote the most desirable type of reaction product. Supported catalysts may be employed, if desired, for particular purposes, especially if the supporting material takes no dominant or particularly active part in the catalytic reactions in which the catalyst is employed.

While mixtures of catalysts have been found to be especially active if even a small proportion of one of the metals, when admixed with the other, is present, mixtures of even adjacent metals such as sodium and potassium are fairly active when 1–99 mol percent of one of the components is present. A concentration of between 10 and 50% of adjacent alkali metals is generally employed. A more striking effect is noted when either lithium or cesium (the alkali metals from the lowest and highest periods) are employed to modify another alkali metal or mixture of metals. In this case the proportion of the lithium or cesium may be much smaller than that of the other alkali metals to obtain even more striking results. When lithium or cesium is employed in an amount even as small as 0.02 mol percent based on the other components, striking results are obtained both with conversion of starting materials and conversion to desired reaction products.

The active alkali metal catalyst is preferably employed in amounts of from 0.01 to about 0.20 mol of alkali metal per mol of the organic compound having an active hydrogen atom. A concentration of about 0.075 to about 0.15 mol of alkali metal mixture per mol of said organic compound is particularly suitable.

The activity of the mixed catalysts is sufficiently greater than that of single alkali metals, even when promoted with the conventional promoters referred to, that they will permit the polymerization of ethylene at a relatively rapid rate. Compounds whose most active hydrogen corresponds to the activity of ethylele, i.e. a pK of 38–40, can thus be condensed with a compound containing an unsaturated linkage according to the process of this invention.

In a prefered embodiment the present invention relates to a method for condensing a compound containing an active hydrogen atom with an organic compound containing an unsaturated linkage by reacting a mixture of said compounds with an alkali metal combination containing at least two alkali metals selected from nonsuccessive periods of the periodic table, and preferably a pair selected from the group consisting of potassium and cesium, lithium and potassium, and lithium and cesium.

The compounds of the first class, characterized by an active hydrogen atom, which form metalated reaction intermediates and with which unsaturated organic compounds can be condensed according to the process of this invention, are selected from the following five groups:

(1) The first group consists of cyclic compounds having attached to a nuclear carbon atom, which is attached by a double bond to another nuclear carbon atom, a carbon atom of a hydrocarbyl group to which carbon atom is attached at least one hydrogen atom.

This group of compounds includes carbocyclic aromatic and hydroaromatic compounds and heterocyclic compounds. The carbocyclic compounds may have a benzene, naphthalene, etc. nucleus. The heterocyclic compounds may have a pyridine, furan, thiophene, pyrrole, pyrazole, etc. nucleus. The compounds may contain both a carbocyclic ring and a heterocyclic ring such as is found in indole and in carbazole. The compounds may also contain both a benzene nucleus and a cycloalkane nucleus such as is found in tetralin and in indan. The hydroaromatic compounds preferably contain non-geminally-substituted carbon atoms. The cyclic compounds preferred for use contain a saturated side chain attached to a nuclear carbon atom by a saturated carbon atom, that is, a carbon atom that is bonded by univalent bonds to four other atoms. The saturated carbon atom should have at least one hydrogen atom attached to it. The side chain may comprise only one carbon atom, as the methyl group in toluene, or it may comprise a number of saturated carbon atoms, in straight-chain or branched-chain relation, such as the normal butyl radical or the isobutyl radical in normal butylbenzene and in isobutylbenzene, respectively. The substituent need not necessarily be an aliphatic chain; it may be a cycloalkane radical as in tetralin or as in cyclohexylbenzene or an aralkyl group, as a benzyl group, as in diphenylmethane.

Suitable cyclic compounds include toluene, ethylbenzene, n-propylbenzene, isopropylbenzene, and n-butylbenzene, isobutylbenzene, sec. butylbenzene, m-xylene, o-xylene, p-xylene, mesitylene, methyl naphthalene, tetralin, indan, diphenylmethane, cyclopentylbenzene, cyclohexylbenzene, methylcyclohexylbenzene, methylethylbenzene, 1-methyl-1-cyclohexene, 1-ethyl-1-cyclohexene, 1-propyl-1-cyclohexene, 1,2-dimethyl-1-cyclohexene, 1,4-dimethyl-1-cyclohexene, 1,3,5-trimethyl-1-cyclohexene, etc. The ring in the compounds herein referred to may contain other substituents, such as a chloro group, a methoxy group, an ethoxy group, a nitro group, and the like.

(2) Although the alkali metal catalysts used previously do not generally permit appreciable reaction of unsubstituted cyclic compounds, the more active catalyst of this invention permit the direct nuclear alkylation of certain unsubstituted cyclic compounds. The second group of suitable compounds containing active hydrogen according to this invention consists of unsubstituted monocyclic or polycyclic, carbocyclic and heterocyclic compounds of aromatic nature. Included in this group are benzene, naphthalene, anthracene and the like, pyridine, furan, thiophene, cyclohexene, etc.

(3) The third group consists of compounds having an olefinic double bond, including acyclic and cyclic olefins.

This group includes ethylene, propylene, 1-butene, 2-butene, isobutylene, 1-pentene, 2-pentene, 1-hexene, 2-hexene, 3-hexene, 1-heptene, 2-heptene, 3-heptene, the four normal octenes, the four normal nonenes, etc., 3-methyl-1-butene, 2-methyl-2-butene, 3-methyl-1-pentene, 3-methyl-2-pentene, 4-methyl-1-pentene, 4-methyl-2-pentene, tetramethylethylene and the like. It also includes cycloolefins, such as cyclopentene, cyclohexene, methylcyclopentene, methylcyclohexene and the like.

(4) The fourth group consists of ammonia and primary and secondary aliphatic amines. The unsaturated compound is added to the amine nitrogen.

Suitable amines include, for example, methylamine, dimethylamine, ethylamine, diethylamine, methylethylamine, n-propylamine, isopropylamine, dipropylamine, diisopropylamine, and numerous other mono- and diamines, e.g., octylamine, didecylamine, tetradecylamine and dioctadecylamine. These compounds can be classified as compounds of the formula $R_1R_2NH$, where $R_1$ and $R_2$ are selected from the group consisting of hydrogen and aliphatic radicals.

(5) The fifth group consists of phosphine and primary and secondary aliphatic phosphines. The unsaturated compound is added to the phosphorus atom.

Suitable phosphines include, for example, methylphosphine, dimethylphosphine, ethylphosphine, and other analogs of the amines mentioned above. These compounds can be classified as compounds of the formula $A_1R_2PH$, where $R_1$ and $R_2$ are selected from the group consisting of hydrogen and aliphatic radicals.

Reactants of the first class, selected from the above-named groups, can be condensed according to the process of the invention, with compounds of the second class, namely unsaturated compounds from one of the following three groups:

(1) The first unsaturated group consists of compounds having a nonconjugated, non-aromatic carbon-to-carbon double bond.

Suitable nonconjugated, olefinically-unsaturated organic compounds and monoolefins such as ethylene, propylene, 1-butene, 2-butene and isobutylene and other monoolefins of higher molecular weight; nonconjugated dienes such as 2,5-dimethyl-1,5-hexadiene and nonconjugated polyolefins containing more than two pairs of double bonds per molecule. Ethylene is particularly preferred in this group. Other preferred compounds in this group are monoolefins in which the alpha carbon atom adjacent to the double bond is a quaternary carbon atom, that is, it contains no hydrogen atoms, such as in 3,3-dimethyl-1-butene. Cyclic olefins are also included, e.g., cyclopentene, cyclohexene, methylcyclopentene, methylcyclohexene, and the like.

(2) The second unsaturated group consists of compounds containing a nonconjugated carbon-oxygen double bond, in which the carbon which is bonded to oxygen does not also contain a hydrogen atom.

Suitable compounds of this type are ketones such as dimethylketone methylethylketone and ketones of higher molecular weight, including cyclic ketones such as cyclohexanone and camphor and diketones such as acetylacetone.

(3) The third unsaturated group consists of unsubstituted carbocyclic aromatics and heterocyclic compounds, including benzene, naphthalene, anthracene, pyridine, furan, thiophene, and the like, and their alkyl-substituted derivatives having at least one nuclear hydrogen. The metalated compound of the first class adds to the nucleus of these compounds.

Not all of the possible reactants of the two general classes are equally reactive. Less reactive species of one class may not react with less reactive ones of the other class. For example, ethylene is a particularly reactive unsaturated reactant and will react even with benzene when the preferred catalysts of this invention are employed, whereas higher olefins or cyclic compounds may result in little or no reaction with benzene. Moreover, it has been found that propylene will condense with ethylene and also that pentene will condense with ethylene in accordance with the process of the present invention. The order in which the groups in each class are listed above is arbitrary and of no chemical significance.

The process of the invention is carried out either on a batch or a continuous type operation in suitable equipment such as autoclaves or tubular reactors constructed from steel or glass-lined steel reactors. At least one or both of the reactants is combined with the alkali metal catalysts in a piece of apparatus which may be referred to as a pretreatment time tank, although this area may be a tubular piece of equipment arranged to pass the reactant and catalyst therethrough for a distance and time sufficient to carry out the specified pretreatment. As stated hereinbefore, this may be for a period from about ¼ to about 4 hours, preferably from about ½ to about 2½ hours. The temperature may be from ambient temperature to as high as about 125° C. but preferably is between about 25° C. and about 100° C.

The pressure during the pretreating stage is not critical. However, in order to promote optimum contact between catalyst and reactants, the pressure is preferably sufficient to provide at least a small proportion of a liquid phase. Thus, with propylene as the only reactant present, the pressure is preferably in excess of 10 atmospheres at room temperature. A liquid phase may, on the other hand, be a normally liquid inert solvent such as heptane.

The pretreatment may be in staged periods at a different temperature level during each period or may be at a constant temperature level or with a substantially continuous increase in temperature. Preferably the mixture is agitated during this period so as to cause relatively intimate contact of the alkali metal catalyst with the reactant. If it is determined that one or the other of two reactants preferentially forms carbanions with or by means of the alkali metal catalyst then it is preferred that at least this reactant be subjected to the pretreatment being described. This may be in the presence or in the absence of the second reactant, although it is convenient to have both present at the same time. The alkali metal catalyst may be added all at one time or at different periods during the pretreatment step. If a mixed alkali metal catalyst is to be employed in the condensation reaction, the pretreatment may be carried out with the mixed catalyst or with any member thereof. Alternatively, the pretreatment may be effected with all of the catalysts to be used in the condensation reaction or with only a portion thereof as long as about 10 percent by weight of the total amount of alkali metal catalyst eventually used is present during pretreatment.

The pretreatment may be split into two sections, one section being utilized for the pretreatment of one species or type of feed material, the other section being employed for pretreatment of at least part of the remainder of the feed material. Thus, the pretreatment for each of these two portions of the feed (which may be identical or different molecules in each portion) enables the use of pretreatment under optimum conditions for each species of material being pretreated. Not only may one chemical type of feed be treated under a different set of pretreating conditions but the alkali metal utilized in each of these two separate sections may be the same or different.

Following the pretreatment procedure as just described, the feed materials and alkali metal catalysts are conducted to a condensation or reaction zone which may be an autoclave or tubular reactor constructed from steel or glass-lined steel reactors. The process is suitably carried out at temperatures from about 150° C. to about 350° C., preferably from about 175° C. to about 250° C. The process pressure is at least about 5 atmospheres absolute and preferably above about 12 atmospheres. Pressures of 100 atmospheres absolute and higher may be employed.

The drawing describes a preferred set of apparatus for carrying out this process. According to the drawing, olefins or other reactants from a storage area 1 are conducted by means of line 21 through pump 2 and line 22 to a mixer 3. The alkali metal catalyst from an area 4 is sent by means of lines 23 to pump 5 and line 24 to the mixer 3 wherein the catalyst and reactants are mixed. The reaction mixture is then sent by means of line 25 to a pretreat time tank 6 which for purposes of simplicity in this case is designated as a single area wherein all of the catalysts and all of the feed is subjected to the pretreatment described. Following the period of pretreatment, the reaction mixture is sent by means of line 26 through a feed booster pump 7 and line 27 to a pipe reactor 8 which is heated by means of line 9. In this reactor the reactants are condensed in the presence of the alkali metal catalyst and the reaction mixture then sent by means of line 28 to a flasher 10. Therein the relatively light products are sent overhead by means of line 29 through a cooler 11 and line 30 to the lower portion of a separator 12. Here the gaseous fraction is taken overhead and sent for processing or recycled by means of line 31 back to an earlier stage in the process. The liquid fraction is taken from the lower portion of the separator and sent for further treating not shown. The liquid portion comprises principally the condensation products obtained during the reaction. Catalysts and heavy ends are taken from the lower portion of the flasher 10 and sent by means of line 32 and 33 for burning and recovery of catalysts or by means of lines 32 and 34 for recycling of the catalyst to an earlier stage in the process prior to the reactor.

The nature of the invention is further illustrated by the following examples, which, however, should not be construed to limit the scope of the invention.

EXAMPLE I

Run number 1 was carried out as follows: A stainless steel autoclave equipped with a magnetic plunger and having 250 cc. capacity was charged with 56 grams of 2-butene and 26.5 grams of ethylene together with 14 grams of normal heptane solvent. The catalyst added to the autoclave was 0.21 gram of sodium and 0.29 gram of potassium. The magnetically operated plunger of the closed autoclave was then started and the autoclave maintained at a temperature of 25° C. for two hours, for 12 minutes at 50° C., 12 minutes at 75° C., and 60 minutes total from 25–100° C. The temperature was held for 1.1 hours at 100° C. after which the temperature was raised to a maximum of 195° C. From an initial autogenous pressure of 340 p.s.i.g., the pressure rose as the autoclave was heated until at a temperature of about 180° C. the pressure was 1030 p.s.i.g. Heating was continued to 195° C. while the pressure continued and then began to drop, indicating completion of the reaction. It required 1 hour for the pressure to drop to one-half of the maximum pressure previously reached. The autoclave was permitted to cool to room temperature and the gas was then vented to a gas collector for analysis and liquid contents were recovered and separately analyzed. The solid residue remaining in the bomb was treated with isopropyl alcohol and additional residual material recovered in isopropyl alcohol solution. This material was also analyzed. The reaction conditions and recovered products are shown in Table 1.

For purposes of comparison, run 2 was performed utilizing all of the same reactants and proportions thereof and conducting the process in precisely the same way as in run 1 except that the pretreatment was eliminated, the temperature being raised as rapidly as possible to about 200° C.

Table 1

|  | Run No. 1 | Run No. 2 |
|---|---|---|
| Feed: |  |  |
| 2-Butene, g./(m.) | 56.0/(1.00) | 57.0/(1.02) |
| Ethylene, g./(m.) | 26.5/(0.95) | 28.8/(1.02) |
| Total, g | 82.5 | 85.0 |
| $C_2/C_4$ Mole Ratio | 0.94 | 0.98 |
| Solvent, n-heptane, g | 14.0 | 13.5 |
| Catalyst, g./(m.): |  |  |
| Na | 0.21/(0.010) | 0.22/(0.010) |
| K | 0.79/(0.020) | 0.78/(0.020) |
| Run Conditions: |  |  |
| Time at 25°, hr | 2.0 |  |
| Time from 25° to 100°, hr.[a] | 1.0 |  |
| Time at 100°, hr | 1.1 |  |
| Max. run temperature, °C.±5 | 195 | 200 |
| Maximum pressure, p.s.i.g. ± 20 | 1,030 at 180° | 1,750 |
| Time to ½ max. press, hr | 1.0 | 1.0 |
| Recovery of feed, percent w | 99.2 | 98.5 |
| Conversion, percent: |  |  |
| of 2-Butene | 76.0 | 62.5 |
| of Ethylene | 92.8 | 64.5 |
| Selectivity [b] of 2-Butene to: |  |  |
| n-Butane | 0.9 | (trace) |
| 3-Methyl-1-pentene | 57.8 | 68.6 |
| 3-Methyl-2-pentenes | 17.2 | 4.3 |
| n-Hexenes | 13.6 | 14.5 |
| $C_8$ Compounds (unidentified) | 8.0 | 3.6 |
| $C_{10}$ Compounds (unidentified) | 1.1 |  |
| Residue |  | 2.8 |
| (Total) | (98.6) | (93.8) |

[a] Temperature raised in even steps, giving 0.2 hour at 50° and 75°.
[b] Defined as moles per 100 moles of 2-butene converted.

According to Table 1 it will be seen that with this particular catalyst system and pair of reactants the use of pretreatment did not cause any change in the ultimate time of condensation. However, the pretreatment caused a 14 percent increase in the conversion of 2-butene and a 28 percent increase in the conversion of ethylene to various products as noted in Table 1.

EXAMPLE II

Run 3 was conducted in essentially the same manner as run 1 but utilizing a catalyst containing lithium in addition to sodium and potassium as noted in the data contained in Table 2. The pretreatment comprised 1 hour at 25° C., 12 minutes at 50° C., 12 minutes at 75° C. and a total of 1 hour from 25–100° C. followed ½ hour at 100° C. The temperature was then raised to the maximum reaction temperature of 175° C., the maximum pressure reached being 1580 p.s.i.g. at 165° C. It is noteworthy that only 0.1 hour was required for the reaction to be completed as indicated by decrease of pressure to ½ of maximum reached during condensation. Also, according to Table 2, it will be seen that a very high conversion of both 2-butene and ethylene was achieved and that a remarkably high yield of 3-methyl-1-pentene (a desired dimer) was obtained.

For comparative purposes, substantially the same catalyst and reactants were treated under the same conditions with omissions of the pretreatment step. The reaction temperature reached a maximum of 200° C. and a maximum pressure of 2220 p.s.i.g. It is noteworthy according to Table 2 that 1.1 hours were required for the reaction to be completed as indicated by a reduction of the pressure to ½ of this maximum. The table also shows that conversion of both 2-butene and ethylene to condensation products was only about ⅔ that of run 3 where a pretreatment step was utilized. Also the conversion to 3-methyl-1-pentene was 17 percent lower than in run 3.

Table 2

|  | Run No. 3 | Run No. 4 |
|---|---|---|
| Feed: |  |  |
| 2-Butene, g./(m.) | 56.5/(1.01) | 57.9/(1.02) |
| Ethylene, g./(m.) | 29.5/(1.05) | 28.5/(1.02) |
| Total, g. | 86.0 | 85.5 |
| $C_2/C_4$ Mole Ratio | 1.04 | 1.00 |
| Solvent, n-heptane, g. | 13.0 | 13.0 |
| Catalyst, g./(m.): |  |  |
| Li | 0.2/(0.028) | 0.2/(0.029) |
| Na | 0.21/(0.010) | 0.22/(0.010) |
| K | 0.79/(0.020) | 0.78/(0.020) |
| Run Conditions: |  |  |
| Time at 25°, hr. | 1.0 |  |
| Time from 25° to 100°, hr.ᵃ | 1.0 |  |
| Time at 100°, hr. | 0.5 |  |
| Max. run temperature, °C. ±5 | 175 | 200 |
| Max. pressure, p.s.i.g. ± 20 | 1,580 at 165° | 2,220 |
| Time to ½ max. press., hr. | 0.1 | 1.1 |
| Recovery of feed, percent w. | 99.3 | 95.2 |
| Conversion, percent: |  |  |
| of 2-Butene | 83.8 | 61.1 |
| of Ethylene | 91.4 | 50.6 |
| Selectivity ᵇ of 2-Butene to: |  |  |
| n-Butane | 0.6 | (trace) |
| 3-Methyl-1-pentene | 55.2 | 38.0 |
| 3-Methyl-2-pentenes | 11.2 | 3.4 |
| n-Hexenes | 17.4 | 26.6 |
| $C_8$ Compounds (unidentified) | 10.9 | 7.9 |
| $C_{10}$ Compounds (unidentified) | 1.4 |  |
| Residue | 0.2 |  |
| (Total) | (96.9) | (75.9) |

ᵃ Temperature raised in even steps, giving 0.2 hour at 50° and 75°.
ᵇ Defined as moles per 100 moles of 2-butene converted.

We claim as our invention:

1. A process for the polymerization of a mono-olefinic feed which comprises contacting the feed and an alkali metal catalyst at a non-polymerizing temperature below about 125° C. for a period of ¼–4 hours and thereafter raising the temperature of the olefinic feed and catalyst to a polymerization temperature between about 150° C. and about 350° C.

2. A process for the dimerization of a mono-olefinic feed stock which comprises contacting the feed and a catalytic proportion of a mixture of at least two unsupported alkali metals at an essentially non-dimerizing temperature between about 20° C. and about 100° C. for a period of time between about ½ and 2½ hours and thereafter raising the temperature to a dimerizing temperature between about 175–250° C.

3. A process for producing a condensation product from a first reactant of the group consisting of alkyl aromatic hydrocarbons and aliphatic mono-olefinic hydrocarbons, and a second reactant of the group consisting of mono-alkenes and non-conjugated alkadienes, wherein the product molecules contain all of the carbon and hydrogen atoms of both reactants, which comprises contacting the reactants at a substantially non-condensing temperature below about 100° C. with at least two alkali metals for a time between about ¼ and about 4 hours and thereafter raising the temperature to a condensing temperature above about 150° C. and a pressure in excess of about 5 atmospheres.

4. In a process for the condensation of 2-butene and ethylene, wherein the two olefins are heated in the presence of a catalytic amount of a mixture of sodium and potassium at a condensation temperature above about 175° C., the improvement comprising preceding the condensation with a non-condensation heating period of the catalyst in contact with the olefins of ¼–4 hours at 20–100° C.

5. In the process for the condensation of propylene and ethylene wherein the two olefins are heated in the presence of a catalytic amount of a mixture of sodium and potassium at a condensation temperature above about 175° C., the improvement comprising preceding the condensation with a non-condensation heating period of the catalyst in contact with the olefins of ¼–4 hours at 20–100° C.

6. In the process for the condensation of pentenes and ethylene wherein the two olefins are heated in the presence of a catalytic amount of sodium and potassium at a condensation temperature above about 175° C., the improvement comprising preceding the condensation with a non-condensation pretreatment period of the catalyst in contact with the olefins of ¼–4 hours at 20–100° C.

7. In the process for the condensation of butenes and ethylene wherein substantially equimolar amounts of butene and ethylene are contacted with an alkali metal catalyst comprising sodium, potassium and lithium at a condensation temperature of about 175–225° C. and a maximum pressure of 1000–25000 p.s.i.g., the improvement comprising preceding the condensation with an essentially non-condensing heating period of the olefins in contact with the catalyst of ¼–4 hours at 20–100° C.

References Cited in the file of this patent

UNITED STATES PATENTS

| 2,492,693 | Freed | Dec. 27, 1949 |
| 2,740,820 | Wilson et al. | Apr. 3, 1956 |
| 2,849,510 | Jaros et al. | Aug. 26, 1958 |
| 2,881,234 | Esmay et al. | Apr. 7, 1959 |